United States Patent [19]
Fujito et al.

[11] Patent Number: 4,722,081
[45] Date of Patent: Jan. 26, 1988

[54] ANALOG OPTICAL TRANSMISSION SYSTEM

[75] Inventors: Katsuyuki Fujito; Yoshiki Nishino; Takeshige Ichida, all of Osaka, Japan

[73] Assignee: Matsushita Electric Industrial Co., Ltd., Japan

[21] Appl. No.: 753,620

[22] Filed: Jul. 10, 1985

[30] Foreign Application Priority Data

Jul. 11, 1984 [JP] Japan .................. 59-143503
Apr. 22, 1985 [JP] Japan .................. 60-85731

[51] Int. Cl.⁴ ............................................. H04B 9/00
[52] U.S. Cl. .................................. 370/3; 350/96.15; 350/96.20; 455/612
[58] Field of Search ............. 350/96.15, 96.16, 96.20, 350/96.21; 455/610, 619, 612; 370/3

[56] References Cited

U.S. PATENT DOCUMENTS 4,307,469 12/1981 Casper et al. .................. 455/613
4,307,934 12/1981 Palmer .......................... 350/96.2

FOREIGN PATENT DOCUMENTS 54-136346 10/1979 Japan ........................ 350/96.15
59-38707  3/1984 Japan ........................ 350/96.2
59-90809  5/1984 Japan ........................ 350/96.2

OTHER PUBLICATIONS

Deichmiller–"Progress in Fiber Optics"–IEEE Trans on Cable Television–vol. CATV-5, No. 2, Apr. 1980, pp. 50–59.

Nawata–Multimode and Single-Mode Fiber Connectors Technology–IEEE Jour. of Quantum Elect.-vol. QE-16, No. 6, Jun. 1980-pp. 618–624.

Primary Examiner—Joseph A. Orsino, Jr.
Attorney, Agent, or Firm—Lowe, Price, Leblanc, Becker & Shur

[57] ABSTRACT

An optical transmission system is disclosed wherein a multiplexed analog signal is supplied to a laser diode to modulate the intensity of a long-wavelength laser beam. A single mode optical fiber transmission medium has a first inclined end face at a proximal end and a second inclined end face at a distal end. The laser beam is coupled to the proximal end of the transmission medium by a coupling means including a single mode optical fiber connecting medium having one end connected to the laser diode and an opposite end having a third inclined end face complementary to the first inclined end face and a coupler for coupling the first and third inclined end faces in abutment relation. An optoelectrical transducer having a light receiving face is located adjacent the distal end of the transmission medium, the light receiving face being parallel to the second inclined end face of the transmission medium to divert rays of light reflecting from the transducer away from the angle of reentry to the transmission medium.

16 Claims, 13 Drawing Figures

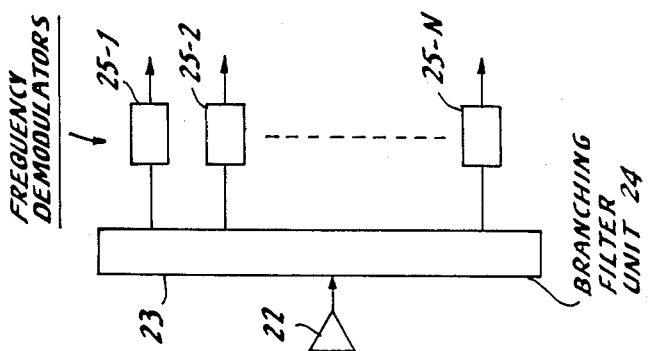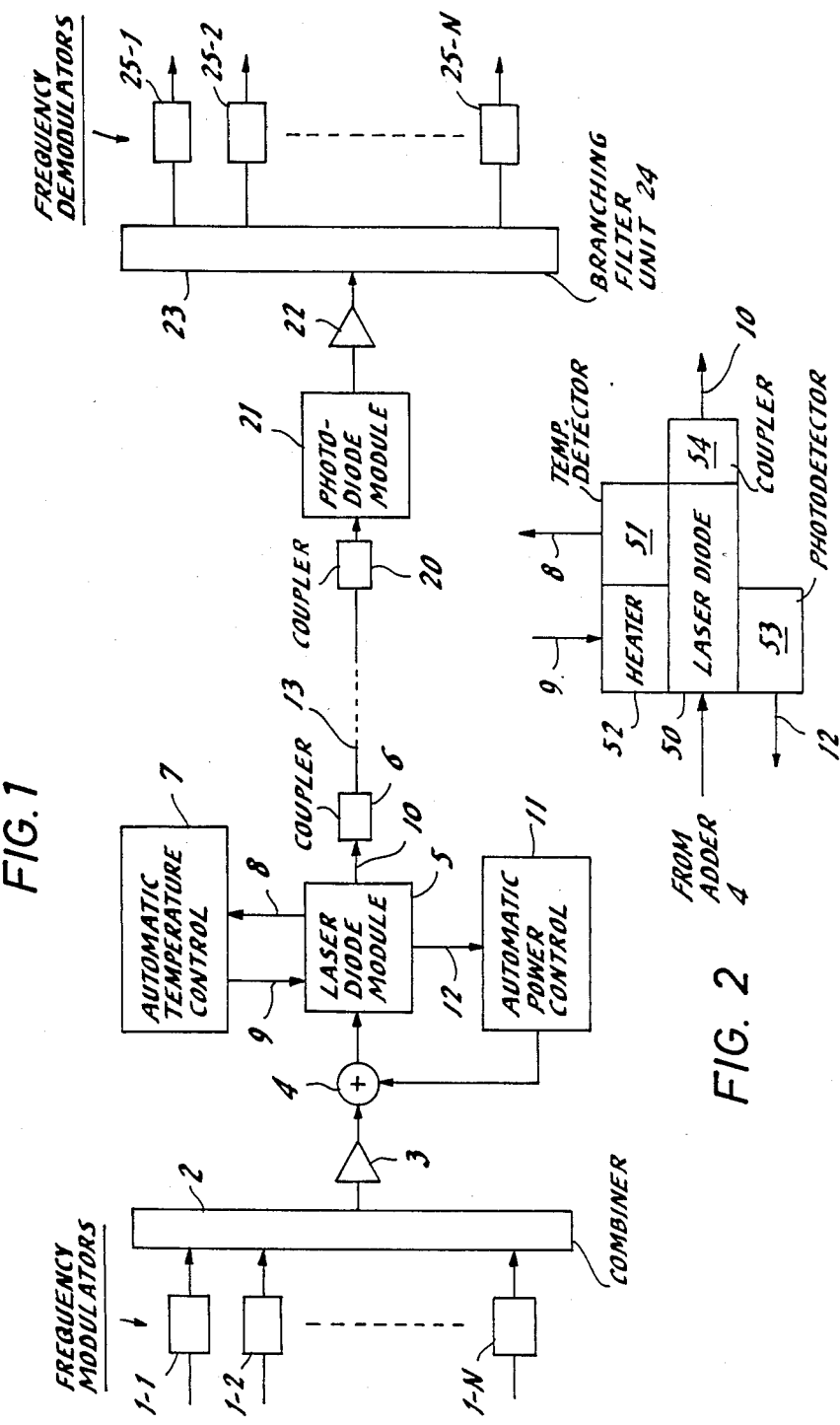

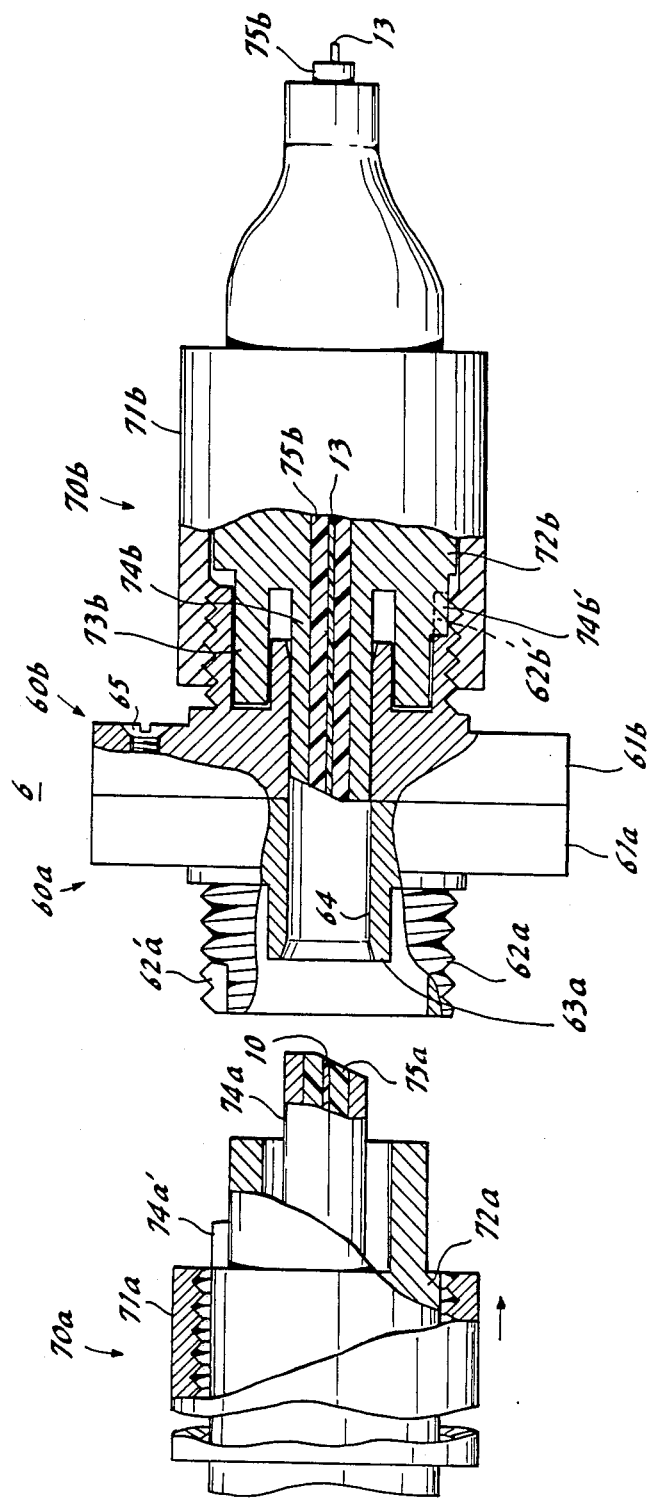

ANALOG OPTICAL TRANSMISSION SYSTEM

BACKGROUND OF THE INVENTION

The present invention relates to an optical transmission system suitable for transmitting frequency division multiplexed analog television signals over a single mode optical fiber. The invention is particularly suitable for CATV and television retransmission applications.

Optical fibers permit transmission of signals either in analog or digital form. Although suitable for long distance transmission, digital systems are costly and require a wide per-channel bandwidth. To avoid these disadvantages, attention has been focused on analog optical transmission systems using a laser diode to take advantage of its linearity and wide frequency range. Since the optical energy is a laser beam, single mode optical fiber can be advantageously employed. However, the laser diode is affected by optical energy that returns from the distant end of the optical fiber, resulting in reflection noise. There is also a signal distortion as a result of multiple reflections that occur between opposite ends of the transmission medium. While frequency modulation techniques may be used to avoid these problems, the maximum number of channels available for transmitting FM television signals is severely limited, typically to four channels.

SUMMARY OF THE INVENTION

It is therefore an object of the present invention to provide an optical transmission system which permits transmission of analog signals on a greater number of channels than is available with prior art analog optical transmission systems.

The above object is obtained by the reduction of noise and intermodulations by use of a long wavelength laser diode and a single mode optical fiber or a transmission medium and coupling inclined end faces of optical transmission mediums in an abutment relationship.

According to the invention, an optical transmission system comprises a laser diode for emitting a long-wavelength laser beam, means for supplying an analog signal to the laser diode to modulate the intensity of the emitted beam, and a single mode optical fiber transmission medium having at a proximal end thereof a first end face inclined at an angle to the perpendidular to the length of the transmission medium and at a distal end a second end face inclined at an angle to the perpendicular to the length of the transmission medium. Coupling means is provided having a single mode optical fiber connecting medium having one end optically connected to the laser diode and an opposite end having an inclined end face complementary to the first inclined end face and a coupler for coupling the first and second inclined end faces in abutment relation. An optoelectrical transducer having a light receiving face is located adjacent the distal end of the transmission medium. The transducer is supported so that its light receiving face is adjacent to and parallel to the second inclined end face of the transmission medium to cause a laser beam leaving the former to fall on the latter.

Preferably, the first and second inclined end faces of the transmission medium are complementary to each other. This arrangement facilitates the lengthening of transmission distance by coupling the second inclined end face of the first transmission medium with the first inclined end face of an additional single mode optical fiber transmission medium.

In a further preferred embodiment, the transmission medium adjacent the proximal end comprises a first cylindrical member, a first internally threaded sleeve axially movably disposed on the first cylindrical member, and a first lug on the first cylindrical member. The connecting medium comprises a second cylindrical member, a second internally threaded sleeve axially movably disposed on the second cylindrical member, and a second lug on the second cylindrical member. The coupler comprises a throughbore for receiving the first and second cylindrical members so that the first and second inclined end faces are brought into abutment, a pair of first and second externally threaded portions for engaging with the first and second sleeves respectively, and first and second guide slots for axially receiving the first and second lugs, respectively.

BRIEF DESCRIPTION OF THE DRAWINGS

The present invention will be described in further detail with reference to the accompanying drawings, in which:

FIG. 1 is a diagrammatic view of a preferred embodiment of the present invention;

FIG. 2 is an illustration of details of the laser diode module of FIG. 1;

FIG. 3 is an illustration of details of the optical coupler of FIG. 1;

DETAILED DESCRIPTION

Figure 4:
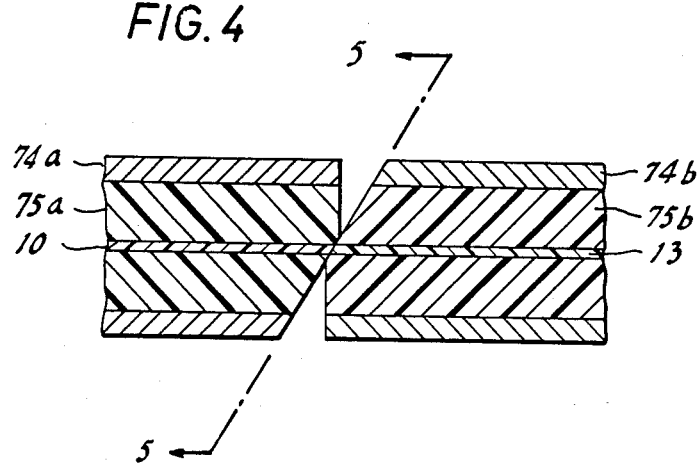
FIG. 4 is a cross-sectional view illustrating the detail of the coupler of FIG. 3.

In FIG. 1, there is shown a preferred embodiment of the optical communication system of the present invention. The system includes a plurality of frequency modulators 1-1 through 1-N. Each of the frequency modulators modulates a carrier with an analog color television signal applied thereto and applies the modulated carrier to a combiner 2. The frequency of each carrier is different from the frequencies of the other carriers so that the inputs of the combiner are frequency-division multiplexed in the combiner and fed through a radio frequency amplifier 3 to an adder 4 as a frequency-modulated, frequency-division multiplexed (FM-FDM) signal. The output of adder 4 is fed to a laser diode module 5. While frequency modulators are shown in FIG. 1, amplitude modulators and a combination of amplitude modulators and frequency modulators can obviously be employed.

As shown in FIG. 2, laser diode module 5 comprises a laser diode 50 which emits a laser beam of a long wavelength typically in a range between 1.3 and 1.5 micrometers. This range of wavelengths is particularly advantageous to the optical communication system of the present invention. The laser diode 50 is connected by a coupler 54 to a pigtail single mode optical fiber 10 which is in turn connected to a coupler 6. The module 5 futher includes a temperature detector 51, a heater 52 and a photodetector 53, all of which are secured to laser diode 50. Temperature detector 51 supplies a signal indicating the operating temperature of the laser diode to an automatic temperature control circuit 7 on conductor 8. The temperature control circuit 7 supplies a control signal on conductor 9 to heater 52 so that the operating temperature of the laser diode is maintained constant at a desired temperature, which is typically 25° C. Photodetector 53 supplies a signal indicating the intensity of the laser generated to an automatic power control circuit 11 on conductor 12. The power control circuit 11 supplies a control signal to adder 4 to be combined with the output of amplifier 3 so that the diode laser operates at a desired power level.

The laser beam generated in diode 50 is sent through pigtail optical fiber 10 to coupler 6 which is connected to one end of a single mode optical fiber 13. The opposite end of the fiber 13 is connected to a coupler 20 located adjacent a photodiode module 21 to generate a signal which is a replica of the original FM-FDM signal. The output of photodiode module 21 is applied through an amplifier 22 to a branching filter unit or demultiplexer 24, which demultiplexes the FM-FDM input signal into individual FM signals and applies them to frequency demodulators 25-1 through 25-N, respectively.

Details of the coupler 6 are shown in FIG. 3. The coupler 6 comprises a pair of female connectors 60a and 60b of identical construction. Each of the female connectors 60 comprises a square-shaped flat member 61, an externally threaded, outer cylindrical portion 62 and an inner cylindrical portion 63 having a bore 64 axially extending therethrough. The flat member 61 of each female connector is connected face-to-face by means of screws 65 to the flat member 61 of the other female connector so that the throughbore 64 of each female connector is precisely aligned with the throughbore of the other. The outer cylindrical portion 62a is formed with a guide slot 62a' and outer cylindrical portion 62b is formed with a similar guide slot 62b' located diametrically opposite to the guide slot 62a'. The coupler 6 further comprises a first male connector 70a which is connected to the end of the pigtail optical fiber 10 opposite to the laser diode 50 and a second male connector 70b which is identical in construction to the first and connected to the transmit end of single mode optical fiber 13. Each of the male connectors 70 comprises an internally threaded sleeve 71 which is axially slidably disposed on an inner member 72. Inner member 72 comprises an outer cylindrical portion 73 and an inner cylindrical portion 74. Inner cylindrical portion 74a of first male connector 70a is engageable with the throughbore 64 of the female connector 60a and inner cylindrical portion 74b of second male connector 70b is likewise engageable with the throughbore 64 of the female connector 70b. Furthermore, outer cylindrical portion 73a is engageable with the outer surface of inner cylindrical portion 63a and outer cylinder 73b is likewise engageable with the outer surface of inner cylindrical portion 63b.

The pigtail optical fiber 10 is cladded with a ferrule 75a to form an optical fiber transmission medium which extends through a bore in the inner cylindrical portion 74a of the first male connector 70a. The single mode optical fiber 13 is likewise cladded with a ferrule 75b to form an optical fiber connecting medium which extends through a bore in the inner cylindrical portion 74b of the second male connector 70b. A lug 74a' is formed on the inner cylindrical portion 74a to engage with guide slot 62a' and a lug 74b' is similarly formed on the inner cylindrical portion 74b to engage with guide slot 62b' to allow the fibers to provide end-to-end contact with each other in a fixed angular position.

Figure 5:
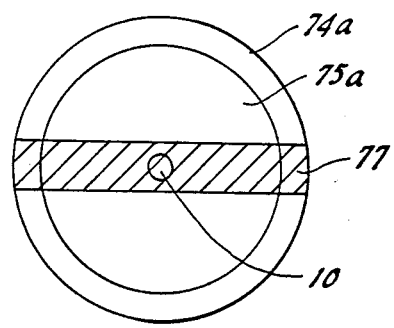
FIG. 5 is a cross-sectional view taken along the lines 5—5 of FIG. 4.

The free end of each inner cylindrical portion 71 with the cladded optical fiber therein is lapped at an angle to the perpendicular to the length of the fiber so that the end of each fiber is exposed on the inclined face of inner cylindrical portion 74. The inclined end of first male connector 70a is facing slightly downward, while the inclined end of second male connector 70b is facing slightly upward, so that when the inner cylindrical portions 74a and 74b are engaged in the aligned bores 64 the inclined end faces of both male connectors are complementary to each other. The inclined end face may cut the transverse cross-section of each inner cylindrical portion 74 throughout. In this case, the lapped end faces may contact at all points of the transverse cross-section. However, in a preferred embodiment of the invention, the inclined end face occupies part of the transverse cross-section of the inner cylindrical portion 74 and provides a rectilinear contact as seen in FIG. 4 so that the area of contact as indicated by hatching 77 in FIG. 5 includes the exposed ends of the fibers 10 and 13.

With the male connectors 70a and 70b respectively engaged in the associated female connectors, the sleeves 71a and 71b are moved toward each other and turned to threadably engage the externally threaded outer cylindrical portions 62a and 62b, respectively. The male connectors are thus axially pressed toward each other and the opposed contact end faces of their inner cylindrical portions are brought into firm rectilinear contact. The turning of the sleeve 71a produces a thrust that tends to twist the optical fiber 10 in one direction and the turning of sleeve 71b produces a thrust that tends to twist optical fiber 13 if the opposite direction by amounts depending on the tolerances that exist between guide slot 62a' and lug 74a' and between guide slot 62b' and lug 74b'. However, the inclined contact area resists the tendencies of the fiber end twist and reduces the coupling loss which would otherwise occur on account of it. In particular, the rectilinear contact area ensures a strong contact between the fibers under the pressure exerted by the tightening of sleeves 71a and 71b and offers an increased resistance to the twisting movements of the fiber ends. To minimize the amount of light reflections which would reenter the laser diode 50 the angle of inclination should be equal to or greater than 6 degrees to the perpendicular to the fiber length.

Figure 6:
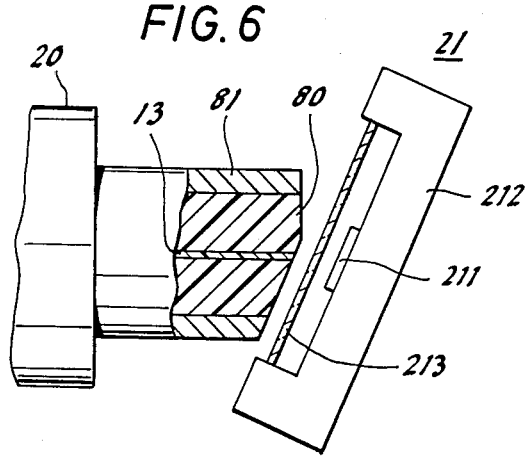
FIG. 6 is an illustration of details of the photodiode module of FIG. 1.

According to a further feature of the invention, the receive end of the transmission medium which comprises a ferrule 80 cladding the fiber 13 and a metal sheath 81 is lapped at an angle of 6 degrees or greater to the perpendicular to the length of fiber 13 so that the end of the fiber 13 is exposed on the lapped end face as shown in FIG. 6 in a manner similar to the transmit end.

Photodiode module 21 includes a photodiode 211 mounted on a support 212 and a protection glass member 213 over the photodiode. The photodiode 211 may be a PiN photodiode or an avalanche photodiode. The support 212 is positioned so that protection glass 213 runs parallel to the lapped end face of the fiber 13. A ray of light leaving the fiber 13 thus strikes the glass 213 at an angle to the perpendicular to the glass plane. Multiple total reflections may occur between the opposite surfaces of the glass, but produce no undesirable interfering light component which would reenter the fiber 13. Further, a portion of the light incident on glass 213 is reflected back into the air at a large angle to the optical axis of fiber 13 and therefore if a fraction of the reflected component reenters the fiber it will not propagate all the way back to the transmit end. The light incident on photodiode 211 is scattered over different paths outside of the angle of reentry to optical fiber 13 and thus produces no undesirable interference. It is preferable that the photodiode 211 be positioned as close as possible to the output end of fiber 13 to allow most of the emitted rays to fall on the photodiode.

Figure 7A:
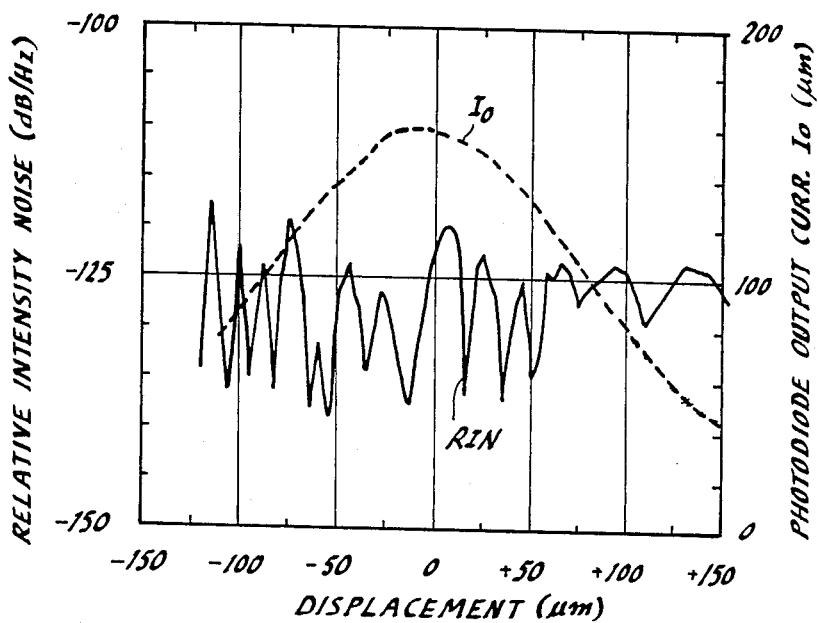
FIGS. 7A and 7B are graphic illustrations of operating characteristics associated with a photodiode when located at long and short distances from the output end of optical fiber, respectively.
Figure 7B:
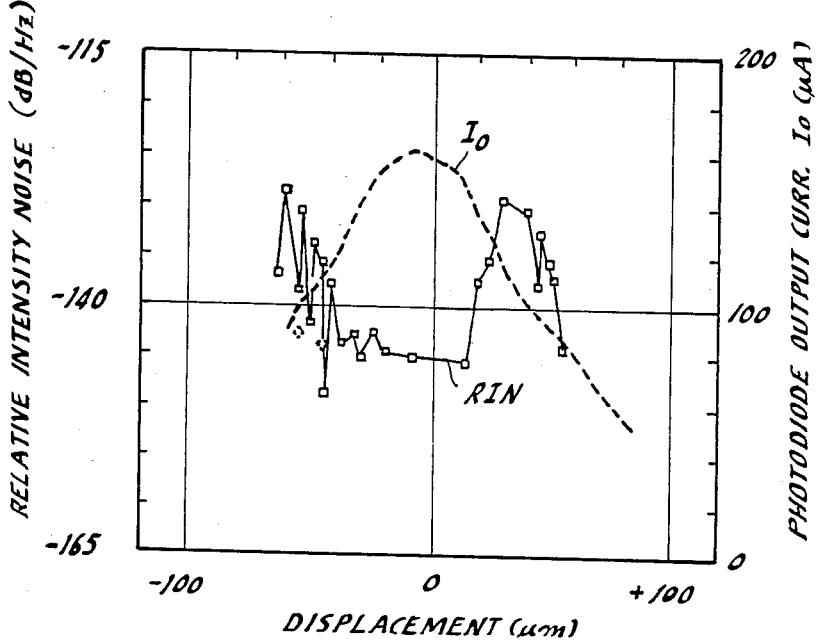

FIGS. 7A and 7B are graphic illustrations of relative intensity noise (RIN) and photodiode's output current (Io) which are plotted as a function of displacement in the distance between the fiber end and photodiode 211 in order to determine the effect of the spatial displacement on the noise and output current performance characteristics. The results obtained by arrangements in which said distance is 1 mm and 0.1 mm are shown respectively in FIGS. 7A and 7B. Comparison of FIGS. 7A and 7B reveals that the relative intensity noise fluctuates violently between −120 dB/Hz and −145 dB/Hz over the range of deviations between ±100 micrometers and beyond in the case of great-distance arrangement, while it stays flat at an acceptable level of −145 dB/Hz in the neighborhood of the zero displacement point in the case of short-distance arrangement, although the photodiode output current decreases more sharply (from the point in which the optical axis of the fiber is aligned with the center of photodiode 211) in the latter case than in the former.

Figure 8:
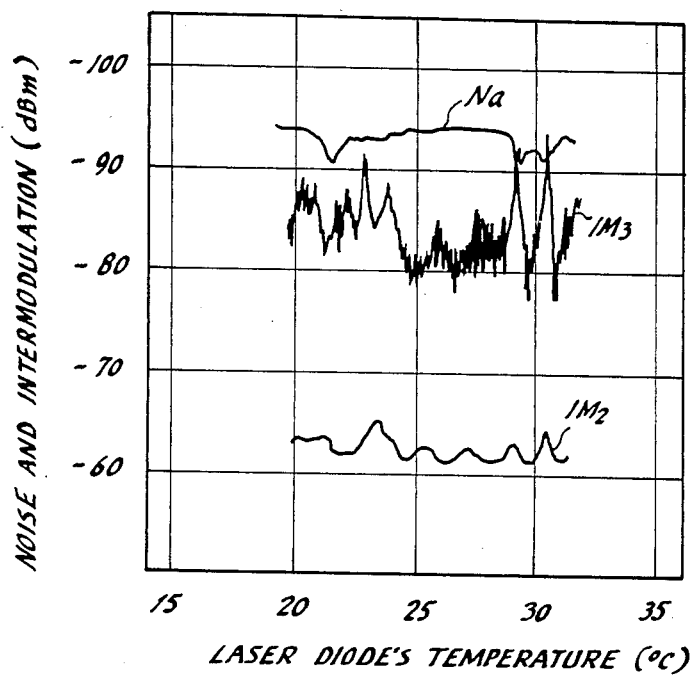
FIG. 8 is a graphic illustration of noise and intermodulation characteristics of the transmission system plotted as a function of the temperature of laser diode.

For purposes of evaluating the transmission characteristics of the optical transmission system of the invention an AM-FDM signal is transmitted at a laserdiode output power level of 3 mW over the distance of 5 km. FIG. 8 is an illustration of the results of the evaluation test. The test items include noise level (Na), second-order intermodulation (IM$_2$) and third-order intermodulation (IM$_3$) measured at the output of receive amplifier 22 and plotted as a function of the temperature of laser diode 50. Two AM television signals are multiplexed on 90 MHz and 100 MHz carriers each with a modulation index of 0.4 with a total modulation index of 0.8. Noise was measured at an acceptable level of −94 dBm over laser diode temperatures ranging between 22° C. and 28° C. Although intermodulations fluctuate with the temperature variation, the fluctuations are below an acceptable value. It is found that when the temperature of laser diode 50 is controlled to within ±0.2° C. by automatic temperature control circuit 7, transmission stability is ensured both in respect of the levels of intermodulations and noise. It is preferable that the laser diode be operated at a minimum power level of 2 mW to stabilize the noise and intermodulation performance characteristics against temperature variations.

Figure 9A:
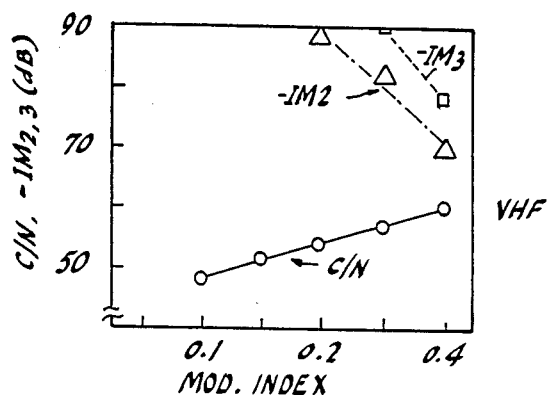
FIGS. 9A to 9C are graphic illustrations of carrier-to-noise and intermodulation characteristics of the transmission system for AM television signals transmitted on the VHF and UHF bands and FM television signals transmitted on the SHF band.
Figure 9B:
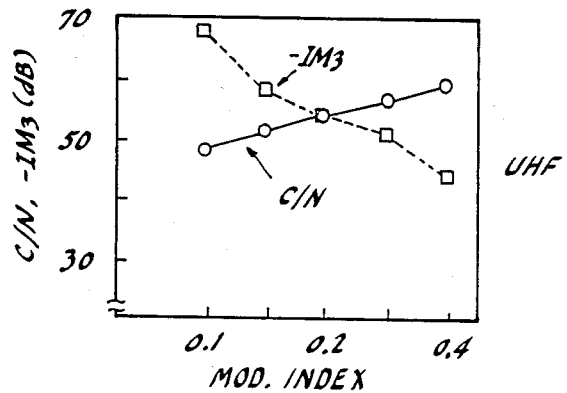
Figure 9C:
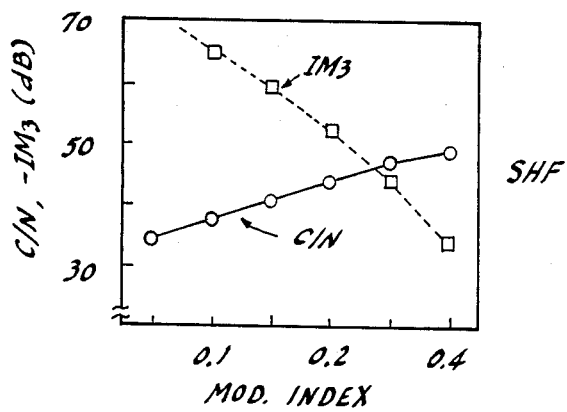

FIGS. 9A to 9C are illustrations of the results of the carrier-to-noise ratio (C/N) and second- and third-order intermodulations of the VHF (50 MHz to 350 MHz), UHF (470 MHz to 770 MHz) and SHF (1.0 GHz to 1.5 GHz which corresponds to the first intermediate frequency of satellite broadcast) bands, respectively, which are plotted as a function of per-channel modulation index using a buried heterostructure (InGasAsP) laser diode and a germanium avalanche photodiode. The signal is transmitted over the distance of 5 km without repeaters and received at a level of −10 dBm. The bandwidth of each channel in the VHF and UHF bands is 4.2 MHz, while the per-channel bandwidth of the SHF band is 27 MHz. It is possible to simultaneously transmit 8 channels of 4.2-MHz bandwidth AM television signal on the VHF band, 7 channels of 4.2-MHz bandwidth AM television signal on the UHF band and more than 8 channels of 27-MHz bandwidth FM television signal on the SHF band.

In prior art systems, a television signal, which is amplitude modulated with a modulation index of 0.1 per channel and transmitted on the VHF band using laser diodes, has experienced a carrier-to-noise ratio of 42 dB and variations of second- and third-order intermodulation in a range between −30 and −70 dB depending on ambient temperature, curvatures of optical fiber and the degree of optical coupling.

As shown in FIGS. 9A to 9C, the present invention ensures satisfactory transmission characteristics despite various unfavorable conditions including ambient temperature variations, curvatures of optical transmission medium, different lengths of transmission medium and the number of couplers involved.

If all of the inputs to the combiner 2 are frequency-modulated television signals as shown in FIG. 1, an estimated signal-to-noise ratio (S/N)w is given by:

$$(S/N)w = C/N + 10\log 1.47(\Delta fm^2/fh^3) \cdot B + 10.9 \qquad (1)$$

where,
C/N = carrier-to-noise ratio,
fh = maximum modulating frequency,
Δfm = maximum frequency shift (p—p), and
B = per-channel bandwidth.

If preemphasis is provided, the last term of Equation 1 is 12.8 dB and the per-channel bandwidth is given by:

$$B > \Delta fm + 2fh \qquad (2)$$

Figure 10:
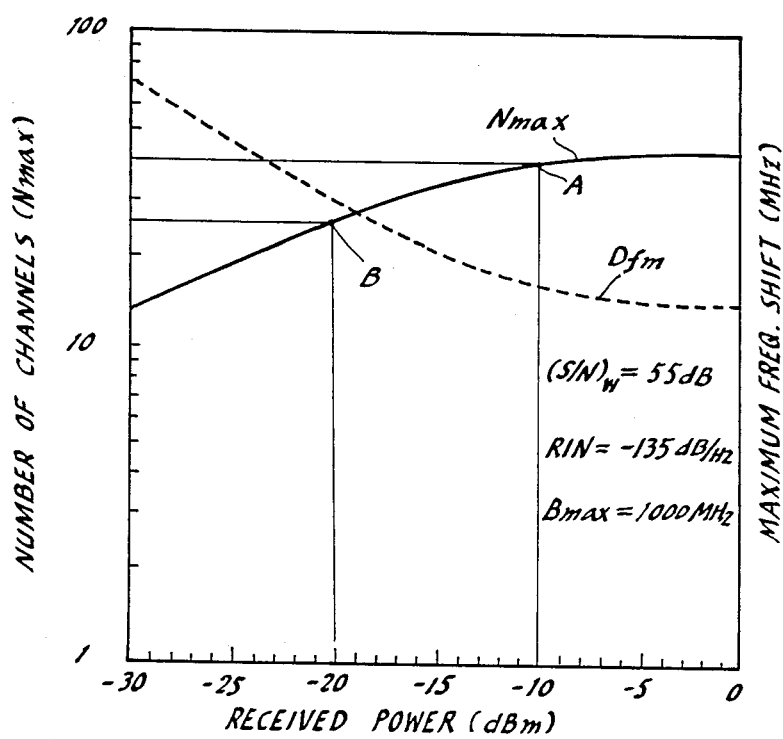
FIG. 10 is a graphic illustration of maximum number of FM television channels and maximum frequency shift plotted as a function of received power level.

Because of the reduction in carrier-to-noise ratio and intermodulations as described above, the optical transmission system of the present invention is capable of transmitting an increased number of FM television signals. From equations 1 and 2 maximum number of frequency-modulated television channels (Nmax) available in a preemphasis system and maximum frequency shift (Dfm) can be plotted as a function of received power level as shown in FIG. 10, using the following parameters:

(S/N)w = 55 dB

RIN = −135 dB/Hz

Maximum bandwidth Bmax = 1000 MHz.

For a reception power level of −10 dBm and a maximum frequency shift 16 MHz, a maximum of 40 channels of FM television signal can be transmitted (see point A) and for a reception power level of −20 dBm and a maximum frequency shift of 30 MHz a maximum of 25 channels is available (point B). Since single mode optical fibers have a transmission bandwidth of several tens of GHz.km or greater, the maximum distance of the fiber is determined by the transmission and reception power levels and the transmission loss of the fiber. Assume that transmission power level is 0 dBm and fiber loss is 0.7 dB/km, the repeater-less transmission distance is about 15 km at −10 dBm reception and 30 km at −20 dBm reception. It is seen that a maximum of 40 channels can be transmitted over a 15-km single mode optical fiber and 25 channels over a 30-km single mode optical fiber.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An optical transmission system comprising:
   a laser diode for emitting a long-wavelength laser beam;
   means for multiplexing a plurality of analog signals respectively upon different frequency carriers to generate a frequency division multiplexed signal and modulating the intensity of said laser beam with said frequency division multiplexed signal;
   a single mode optical fiber transmission medium having at a proximal end thereof a first inclined end face inclined at an angle to the perpendicular to the length of the medium and at a distal end thereof a second inclined end face inclined at an angle to the perpendicular to the length of said medium;
   coupling means for coupling said intensity modulated laser beam to said proximal end of said transmission medium, said coupling means including a single mode optical fiber connecting medium having one end optically connected to said laser diode and an opposite end having a third end face complementary to said first inclined end face at said proximal end of said transmission medium and a coupler for coupling said first and third inclined end face in abutment relation; and
   an optoelectrical transducer means having a light receiving face parallel with said second inclined face at said distal end of said transmission medium.

2. An optical transmission system as claimed in claim 1, further comprising means for controlling said laser diode at a constant temperature.

3. An optical transmission system as claimed in claim 1, wherein said analog signals are television signals, and said multiplexing means comprises a plurality of frequency modulators for frequency modulating said carriers with said analog television signals and means for combining output signals from the frequency modulators to generate a frequency modulated frequency division multiplexed (FM-FDM) signal and modulating said laser beam with the FM-FDM signal.

4. An optical transmission system as recited in claim 1 wherein:
   said third inclined end face includes a first portion parallel to the perpendicular to the length of the medium and a second portion inclined at said angle to the perpendicular to the length of the medium.

5. An optical transmission system as recited in claim 1 wherein:
   said coupler includes two cylindrical male members; each male member having a throughbore for a respective one of said transmission medium optical fiber and said coupling means optical fiber,
   each of said male members including a ferrule formed for abutting contact therebetween;
   each ferrule having substantailly identical cylindrical abutting structure including a first surface perpendicular to the longitudinal direction of the respective optical fiber therein and a second, butting, surface inclined at said angle to the first surface;
   said first perpendicular surface circumscribed by:
   a chord extending between two points on a circumference of a perpendicular circular cross-section of the male member, said chord dividing the perpendicular cross-section to a first minor portion forming said first perpendicular surface and a second major portion, and a circumferential arc between said two points on the circumference and subtending an angle less than 180° with respect to a center of the perpendicular cross-section;
   said second, butting, surface being angularly inclined with respect to and intersecting said first, perpendicular, surface at said chord;
   said second ferrule abutting structure being substantially identical to the arrangement on said first ferrule and rotated 180° relative thereto about an axis parallel to the longitudinal direction of the optical fiber therein;
   said inclined butting surfaces abutting each other in a substantially rectangular strip formed thereby and inclined with respect to said perpendicular surfaces and including said optical fibers therein.

6. An optical transmission system as claimed in claim 1, wherein said first and second inclined end faces are mutually complementary to each other.

7. An optical transmission system as claimed in claim 6, further including a supporting means for supporting said transducer means, wherein said supporting means comprises a transparent protection member covering said transducer means, said protection member being parallel to said light receiving face and to said second inclined end face.

8. An optical transmission system as claimed in claim 1, wherein said first inclined end face has an angle of inclination equal to or greater than 6 degrees to the perpendicular to the length of said transmission medium and said third inclined end face has an angle of inclination equal to or greater than 6 degrees to the perpendicular to the length of said connecting medium.

9. An optical transmission system as claimed in claim 8, wherein said second inclined end face has an angle of inclination equal to or greater than 6 degrees to the perpendicular to the length of said transmission medium.

10. An optical transmission system as claimed in claim 8, further comprising means for controlling said laser diode at a constant temperature.

11. An optical transmission system claimed in claim 10, wherein said first inclined end face is of a part-circular shape and said third inclined end face is of a part-circular shape identical and complementary to the first inclined end face, said part-circular shaped end faces providing a rectilinear area contact therebetween.

12. An optical transmission system as claimed in claim 1,
   wherein said transmission medium comprises a first cylindrical member adjacent said proximal end, a first internally threaded sleeve axially movably disposed on said first cylindrical member, and a first lug on said first cylindrical member;

wherein said connecting medium comprises a second cylindrical member adjacent the opposite end thereof, a second internally threaded sleeve axially movably disposed on said second cylindrical member, and a second lug on said second cylindrical member; and wherein said coupler comprises a throughbore for receiving said first and second cylindrical members so that the first and third inclined end faces are brought into abutment, a pair of first and second externally threaded portions for engaging with said first and second sleeves respectively, and first and second guide slots for axially receiving said first and second lugs, respectively.

13. An optical transmission system as claimed in claim 12, wherein said first and second lugs are located in diametrically opposite positions with respect to each other and said first and second guide slots are likewise located in diametrically opposite positions with respect to each other.

14. An optical transmission system as recited in claim 1 wherein:

said first inclined end face includes a first portion parallel to the perpendicular to the length of the medium and a second portion inclined at said angle to the perpendicular to the length of the medium.

15. An optical transmission system as recited in claim 14 wherein:

said third inclined end face includes a first portion parallel to the perpendicular to the length of the medium and a second portion inclined at said angle to the perpendicular to the length of the medium.

16. An optical transmission system as recited in claim 15 wherein:

said first portions of said first and third inclined end faces extending over respective portions of the respective end faces subtended by respective chords of cross-sections of said end faces of the optical fibers, said chords each having a length smaller than a diameter of the respective end faces, said second portions of each of said first and third inclined end faces including respective abutting areas of contact extending from said respective chords to corresponding, substantially parallel, chords on opposite sides of the respective centers of said end faces, said first and third inclined end faces contacting one another in abutment relation only at the areas of contact of the respective second portions thereof, whereby said abutting second portions of said first and third inclined end faces form a continuing plane inclined at said angle to the perpendicular to the length of the medium and extending on both sides of said contact areas.

* * * * *